(12) United States Patent
Bruder et al.

(10) Patent No.: US 6,819,735 B2
(45) Date of Patent: Nov. 16, 2004

(54) HISTOGRAM-BASED IMAGE FILTERING IN COMPUTED TOMOGRAPHY

(75) Inventors: Herbert Bruder, Höchstadt (DE); Thomas Flohr, Uehlfeld (DE); Rainer Raupach, Adelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/606,798

(22) Filed: Jun. 27, 2003

(65) Prior Publication Data

US 2004/0064038 A1 Apr. 1, 2004

(30) Foreign Application Priority Data

Jun. 28, 2002 (DE) ......................................... 102 29 113

(51) Int. Cl.$^7$ .................................................. A61B 6/03
(52) U.S. Cl. ............................................ 378/8; 378/901
(58) Field of Search ........................... 378/4, 8, 15, 19, 378/901

(56) References Cited

U.S. PATENT DOCUMENTS 4,922,915 A * 5/1990 Arnold et al. ............... 382/128
6,658,080 B1 * 12/2003 Poole et al. .................... 378/4

FOREIGN PATENT DOCUMENTS

DE          100 52 540 A1     5/2002

OTHER PUBLICATIONS

Morneburg, H.: "Blidgebende Systeme für die medizinische Diagnostik", Publicis MCD Verlag, 1995, Seiten 119–122, 342–344, 447–449.

Flohr, T. et al., "Fast image filters as an alternative to reconstruction kernels in Computed Tomograhy", Proceedings of SPIE, vol. 4322 (2001), pp 924–933.

* cited by examiner

*Primary Examiner*—David V Bruce
(74) *Attorney, Agent, or Firm*—Harness, Dickey & Pierce, P.L.C.

(57) ABSTRACT

A method is for organ-specific image optimization in computed tomography. In this case, the HU values of a layer of the body previously recorded with a CT device are calculated and, on this basis, a first CT image is created. For this first CT image, a histogram is also created, in which the frequency distribution of the HU values is reproduced. In a histogram, at least one organ-specific HU region is defined and the latter is allocated an HU-dependent transfer function. Furthermore, a second CT image is created on the basis of the previously calculated HU values for the layer of the body which has been recorded. The first and second CT image are filtered with the HU-dependent transfer function and, finally, the filtered first CT image is mixed with the filtered second CT image.

32 Claims, 5 Drawing Sheets

FIG 1

HISTOGRAM-BASED IMAGE FILTERING IN COMPUTED TOMOGRAPHY

The present application hereby claims priority under 35 U.S.C. §119 on German patent application number DE 10229113.6 filed Jun. 28, 2002, the entire contents of which are hereby incorporated herein by reference.

BACKGROUND OF THE INVENTION

With modern medical diagnostic methods, such as X-ray computed tomography (CT), image data can be obtained from a measured object that has been examined. As a rule, the measured object that has been examined is a patient.

X-ray computed tomography—designated CT for short below—is a specific X-ray recording method which, in terms of image structure, differs fundamentally from the classical X-ray layer recording method. In the case of CT recordings, transverse slices are obtained, that is to say depictions of body layers which are oriented substantially at right angles to the axis of the body. The tissue-specific physical variable represented in the image is the distribution of the attenuation of X radiation $\mu(x,y)$ in the section plane. The CT image is obtained by way of reconstruction of the one-dimensional projections, supplied by the measuring system used, of the two-dimensional distribution of $\mu(x,y)$ from numerous different viewing angles.

The projection data is determined from the intensity I of an X-ray after its path through the layer to be depicted and its original intensity $I_0$ at the X-ray source in accordance with the absorption law:

$$\ln \frac{I}{I_0} = \int_L \mu(x, y) dl \qquad (1)$$

The integration path L represents the path of the X-ray considered through the two-dimensional attenuation distribution $\mu(x,y)$. An image projection is then composed of the measured values of the linear integrals through the object layer obtained with the X-rays from one viewing direction.

The projections originating from an extremely wide range of directions—characterized by the projection angle α—are obtained by way of a combined X-ray detector system, which rotates about the object in the layer plane. The devices which are most common at present are what are known as "fan ray devices", in which tubes and an array of detectors (a linear arrangement of detectors) in the layer plane rotates jointly about a centre of rotation which is also the centre of the circular measurement field. The "parallel beam devices", afflicted by very long measuring times, will not be explained here. However, it should be pointed out that transformation from fan to parallel projections and vice versa is possible, so that the present invention, which is to be explained by using a fan beam device, can also be applied without restriction to parallel beam devices.

In the case of fan beam geometry, a CT recording includes linear integral measured values $-\ln(I/I_0)$ of incoming beams, which are characterized by a two-dimensional combination of the projection angle $\alpha \epsilon [0, 2\pi]$ and the fan angles $\beta \epsilon [-\beta_0, \beta_0]$ ($\beta_0$ is half the fan opening angle) which define the detector positions. Since the measuring system only has a finite number k of detector elements, and a measurement consists of a finite number y of projections, this combination is discrete and can be represented by a matrix:

$$\tilde{p}(\alpha_y, \beta_k):[0, 2\pi] \times [-\beta_0, \beta_0] \qquad (2)$$

or $$\tilde{p}(y, k):(1, 2, \ldots N_P) \times (1, 2, \ldots N_S) \qquad (3)$$

The matrix $\tilde{p}(y, k)$ is called the sinugram for fan beam geometry. The projection number y and the channel number k are of the order of magnitude of 1000.

If the logarithms are formed in accordance with equation (1), then the linear integrals of all the projections $$p(\alpha; \beta) = \ln \frac{I}{I_0} = -\int_L \mu(x, y) dl \qquad (2)$$

are therefore obtained, their entirety also being referred to as the radon transform of the distribution $\mu(x,y)$. Such a radon transformation is reversible, and accordingly $\mu(x,y)$ can be calculated from $p(\alpha, \beta)$ by back-transformation (inverse radon transformation).

In the back-transformation, a convolution algorithm is normally used, in which the linear integrals for each projection are firstly convoluted with a specific function and then back-projected onto the image plane along the original beam directions. This specific function, by which the convolution algorithm is substantially characterized, is referred to as a "convolution core".

By way of the mathematical configuration of the convolution core, there is the possibility of influencing the image quality specifically during the reconstruction of a CT image from the raw CT data. For example, by way of an appropriate convolution core, high frequencies can be emphasized, in order to increase the local resolution in the image, or by way of a convolution core of an appropriately different nature, high frequencies can be damped in order to reduce the image noise. In summary, therefore, it is possible to state that, during the image reconstruction in computed tomography, by selecting a suitable convolution core, the image characteristic, which is characterized by image sharpness/image contrast and image noise (the two behave in a fashion complementary to each other), can be influenced.

The principle of image reconstruction in CT by calculating the $\mu$-value distribution will not be discussed further. An extensive description of CT image reconstruction is presented, for example, in "Bildgebende Systeme für die medizinische Diagnostik" [Imaging systems for medical diagnostics], 3rd ed, Munich, Publicis MCD Verlag, 1995, author: Morneburg Heinz, ISBN 3-89578-002-2.

However, the task of image reconstruction has not yet been completed with the calculation of the $\mu$-value distribution of the transilluminated layer. The distribution of the attenuation coefficient $\mu$ in the medical area of application merely represents an anatomical structure, which still has to be represented in the form of an X-ray image.

Following a proposal by G. N. Hounsfield, it has become generally usual to transform the values of the linear attenuation coefficient $\mu$ (which has the dimensional unit cm$^{-1}$) to a dimensionless scale, in which water is given the value 0 and air the value −1000. The calculation formula for this "CT index" is:

$$CT\ index = \frac{\mu - \mu_{water}}{\mu_{water}} 1000 \qquad (4)$$

The unit of the CT index is called the "Hounsfield unit" (HU). This scale, referred to as the "Hounsfield scale", is very well suited to the representation of anatomical tissue, since the unit HU expresses the deviation in parts per thousand from $\mu_{water}$ and the $\mu$ values of most substances inherent in the body differ only slightly from the $\mu$ value of water. From the numerical range (from −1000 for air to about 3000), only whole numbers are used to carry the image information.

However, the representation of the entire scale range of about 4000 values would by far exceed the discriminating power of the human eye. In addition, it is often only a small extract from the attenuation value range which is of interest to the observer, for example the differentiation between gray and white brain substance, which differ only by about 10 HU.

For this reason, use is made of what is known as image windowing. In this case, only part of the CT value scale is selected and spread over all the available gray stages. In this way, even small attenuation differences within the selected window become perceptible gray tone differences, while all CT values below the window are represented as black and all CT values above the window are represented as white. The image window can therefore be varied as desired in terms of its central level and also in terms of its width.

Now, in computed tomography, it is of interest in specific recordings to perform organ-specific settings of the image characteristic and, under certain circumstances, organ-specific windowing. For example, in the case of transverse slices through the breast cavity—in which heart, lungs, spinal column are recorded at the same time—organ-specific optimization of the image representation leads to a far better overview and makes it easier for the user to interpret the CT recording.

A recording optimized in this way is made, in accordance with the prior art, in that, following recording of the relevant layer, by using different convolution cores during the image reconstruction from the raw data, a series of images is produced which in each case differ from one another in terms of different image characteristics (contrast, noise). The user then decides in which image the respective organ is represented optimally in accordance with the diagnostic requirement. In the selected images, the user must segment—in other words: "mark" and "cut out"—the respective organ and insert it into the final image. For the purpose of segmentation, what are known as segmentation algorithms are available to the user. These generally function in such a way that, within the organ to be segmented, a starting point is set by the user, from which the edge of the organ is determined in accordance with different points of view. The algorithm is moved along the organ boundary until the entire organ has been scanned and therefore cut out and can be inserted into the final image.

The procedure during segmentation of this type according to the prior art is very time-consuming, since the user has to analyze the entire series of images. Secondly, when cutting out and inserting the segmented organ, no image information must be lost in the transition region (marginal region of the organ), which is not guaranteed in the case of current segmentation algorithms—which additionally (as far as development and computing power are concerned) are extremely complicated.

Distinguishing organs in a representation can also be carried out by way of a transfer function, which finds and delimits anatomically associated gray value regions in the CT image. This is possible since the attenuation factors in the Hounsfield scale, HU values, as they are known, occupy different regions, depending on the organ. Typically, a transfer function allocates all organ-specific attenuation factors a specific gray value or a specific color. In DE 100 52 540 A1 a diagnostic device is described in which interactive determination of organ-specific gray value regions in a medical image is made possible.

For this purpose, a histogram is created from the raw data of the medical image and visualized on a user interface. By way of a dialogue interface, the user can then enter values for the determination of an organ-specific gray value region and obtains these values represented as a trapezoidal function in the histogram itself. The values entered thus determine the range of the gray values to be treated and their colored representation in the image, such as color, brightness and hiding power. Values at the edges of the set gray value region are converted with a higher transparency than those in the central region of the selected gray value interval.

The disadvantage in this case is that adjacent, similar cases exhibit attenuation or gray values in a coherent region of the histogram. The use of the transfer function thus leads to indistinguishability of the two tissues in the image treated.

SUMMARY OF THE INVENTION

It is therefore an object of an embodiment of the present invention to propose a technique for improving organ-specific image optimization which, in particular, effects optical separation of adjacent tissues of similar consistency in the resulting image.

An object may achieved in particular by a method according to an embodiment of the invention for organ-specific image optimization in computed tomography, the HU values of a layer of the body previously recorded by a CT device being calculated and, on this basis, a first CT image being created. For this first CT image, a histogram is also created, in which the frequency distribution of the HU values is reproduced. In the histogram, at least one organ-specific HU region is defined and this is allocated an HU-dependent transfer function. Furthermore, a second CT image is created on the basis of the previously calculated HU values for the recorded layer of the body. The first and second CT image are filtered with the HU-dependent transfer function and, finally, the filtered first CT image is mixed with the filtered second CT image.

Furthermore, an object may be achieved by a computed tomography device which includes a computer for processing measured data and a monitor for visualizing the data processed by the computer, the computer being designed to carry out a method according to an embodiment of the invention.

Furthermore, an object may be achieved by a computer program product which has a series of physical states which are suitable to be implemented by a computing device which is connected to a computed tomography device in such a way that a method according to an embodiment of the invention is carried out on a computed tomography device.

Mixing two images indicates that both the characteristics of the first and the characteristics of the second image are expressed in the resulting mixed image, with which, for example, tissue boundaries together with tissue types can be represented.

An improvement in the result can be achieved if a first image filter is used for creating the first CT image and/or a second image filter is used for creating the second CT image. As an alternative to this, the first CT image can also be created with the aid of a first convolution core, the second CT image also or additionally with a second convolution core. In both methods, the first CT image is advantageously reproduced as a smoothed CT image, the second CT image, if required, as a high-contrast CT image. In this case, the terms first and second CT image relate only to the distinguishability of the two images, not to a certain order, so that the first CT image can also have high contrast, while the second has a smoothed characteristic.

With regard to good representation of an organ-specific tissue in the resulting image, the magnitude of the HU-dependent transfer function moves in an interval between 0 and 1, it being further possible for the mixing of the first CT image with the second CT image to be carried out expediently as a weighted, pixel by pixel addition of the first CT image to the second CT image. In a preferred embodiment of the present invention, the weighting factor of the first CT image in this case corresponds to the magnitude of the HU-dependent transfer function, and the weighting factor of the second CT image corresponds to the difference between the magnitude of the HU-dependent transfer function and the value 1. In an alternative, likewise preferred embodiment, the weighting factor of the second CT image corresponds to the magnitude of the HU-dependent transfer function, and the weighting factor of the first CT image corresponds to the difference between the magnitude of the HU-dependent transfer function and the value 1.

Furthermore, in order to create the first and/or second CT image, a two-dimensional, separable image filter can be used. As alternative to this, however, use can also be made of a one-dimensional image filter to create the first and/or the second CT image.

Simple detection of organ-specific tissue regions in the resulting CT image can be achieved by different, organ-specific HU regions being represented with different windowing.

BRIEF DESCRIPTION OF THE DRAWINGS

Further features, characteristics and advantages of the present invention will now be explained by using exemplary embodiments and with reference to the accompanying figures of the drawings.

DETAILED DESCRIPTION OF THE PREFERRED EMBODIMENTS

Figure 1:
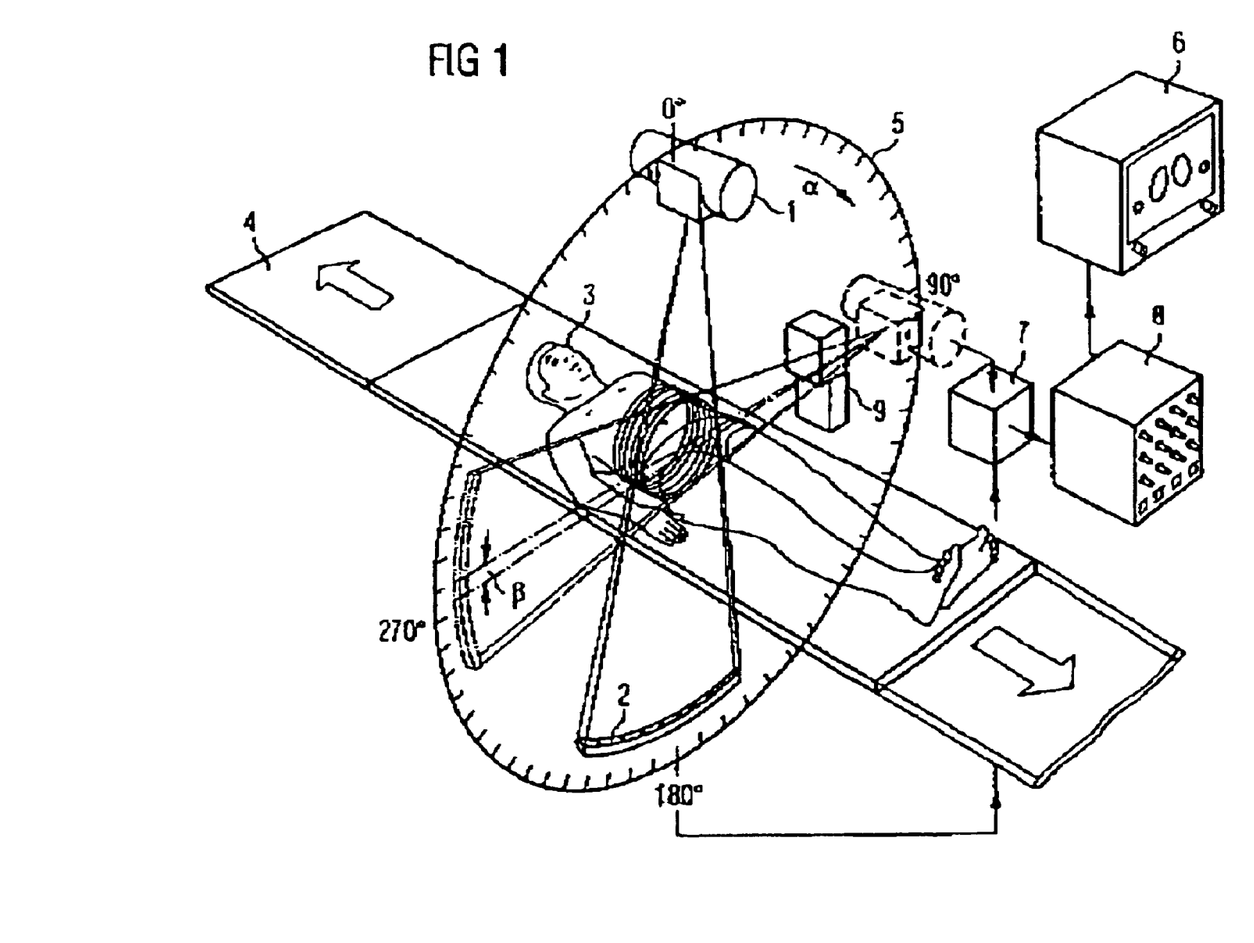
FIG. 1 shows schematically a CT apparatus for a fan beam method according to an embodiment of the present invention.

FIG. 1 illustrates schematically a computed tomography device for a fan beam method which operates in accordance with an embodiment of the present invention. In this device, X-ray tubes 1 and beam receivers 2 (detectors) rotate jointly about a centre of rotation, which is also the centre of the circular measuring field 5, and at which the patient 3 to be examined is located on a patient couch 4. In order to be able to examine different parallel planes of the patient 3, the patient couch can be displaced along the longitudinal axis of the body.

As can be seen from the drawing, transverse slices emerge during CT recordings, that is to say depictions of layers of the body which are oriented substantially at right angles to the axis of the body. This layer representation method represents the distribution of the attenuation value $\mu_z(x,y)$ itself (z is the position on the longitudinal axis of the body). Computed tomography (referred to as CT below) needs projections at very many angles $\alpha$. In order to produce a layer recording, the radiation cone emitted by the X-ray tube 1 is masked out in such a way that a flat beam fan is produced, which forms one-dimensional central projections of the transilluminated layer.

For the purpose of exact reconstruction of the distribution of the attenuation values $\mu_z(x,y)$, this beam fan must be at right angles to the axis of rotation and, in addition, must be spread to such an extent that, from each projection direction $\alpha$, it completely covers the envisaged layer of the measured object. This beam fan passing through the object is intercepted by detectors which are arranged linearly on a circular segment. In the case of commercially available devices, these are up to 1000 detectors. The individual detector reacts to the incident beams with electrical signals whose amplitude is proportional to the intensity of the beams.

Each individual detector signal belonging to a projection a is in each case picked up by measuring electronics 7 and forwarded to a computer 8. Using the computer 8, the measured data can then be processed in a suitable way and initially visualized on a monitor 6 in the form of a sinugram (in which the projection $\alpha$ is plotted as a function of the measured values from the corresponding channel $\beta$) in what are known as Gordon units, but finally in the form of a natural X-ray image in Hounsfield units.

It is an object of an embodiment of the present invention, by way of a suitable method which is ultimately to be implemented and carried out in the computer 8, to construct in a simple and rapid way a CT image in which the different anatomical tissue types are represented with different image characteristics (image sharpness and image noise) and thus an organ-specifically optimized CT image is obtained.

An embodiment of the present invention makes use of the fact that the CT values (HU values) occupy different regions in the Hounsfield scale, depending on the organ.

Figure 2:
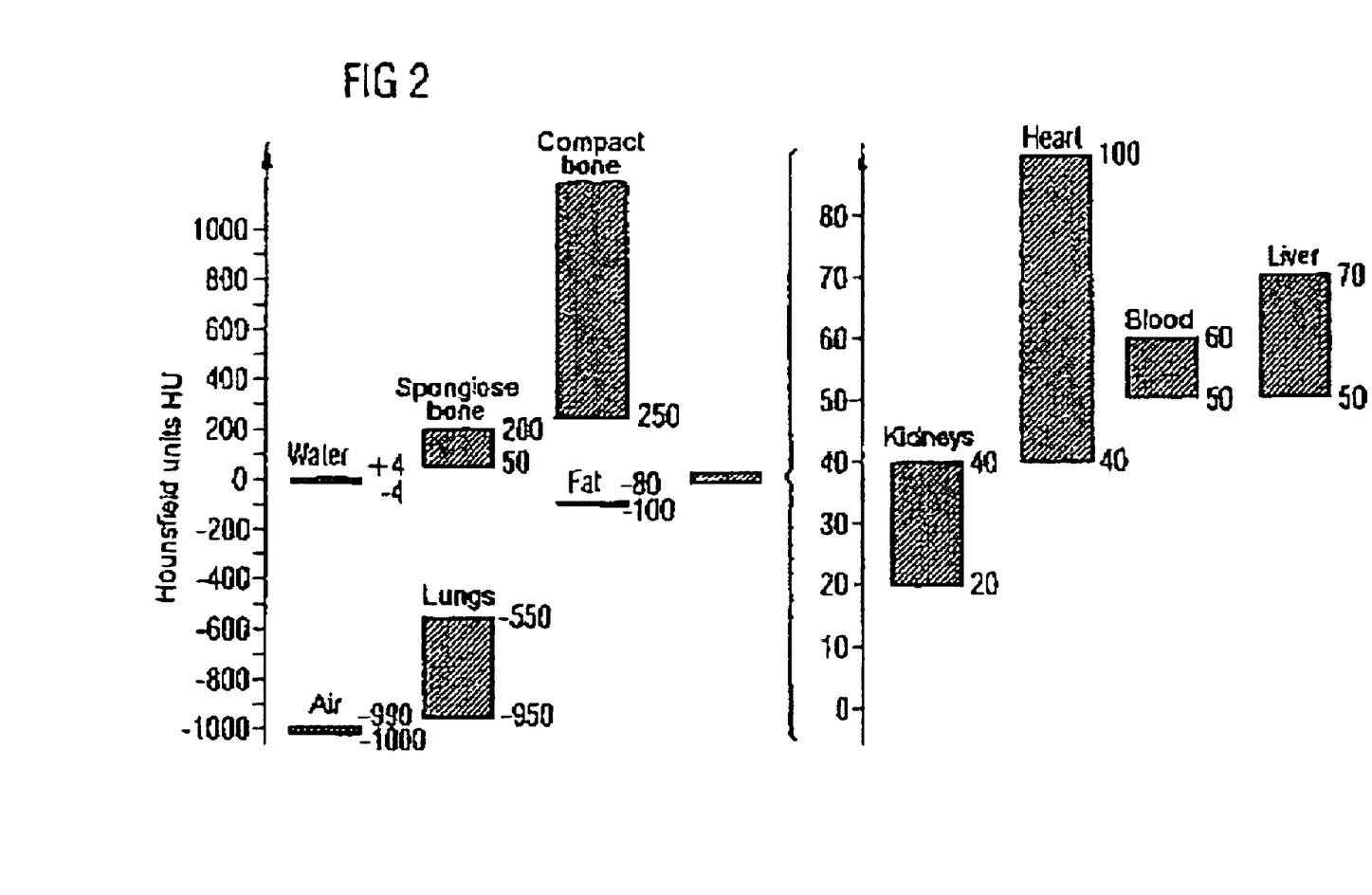
FIG. 2 shows a Hounsfield scale in which the Hounsfield units (HE) of different organs in the human body are indicated.

The Hounsfield scale is illustrated in FIG. 2. The CT values of the individual organs occupy specific regions, largely irrespective of the X-ray spectrum used. For example, lung tissue and fat, because of their low density and the low attenuation induced by this, exhibit negative CT values in the range from −950 to −550 and −100 to −80, respectively. Most other tissues lie in the positive range (kidneys: 20–40, heart: 40–100, blood: 50–60, liver: 50–70). Bone tissue, because of the high order number of calcium, and therefore the higher attenuation, has CT values up to 2000 HU.

Figure 3:
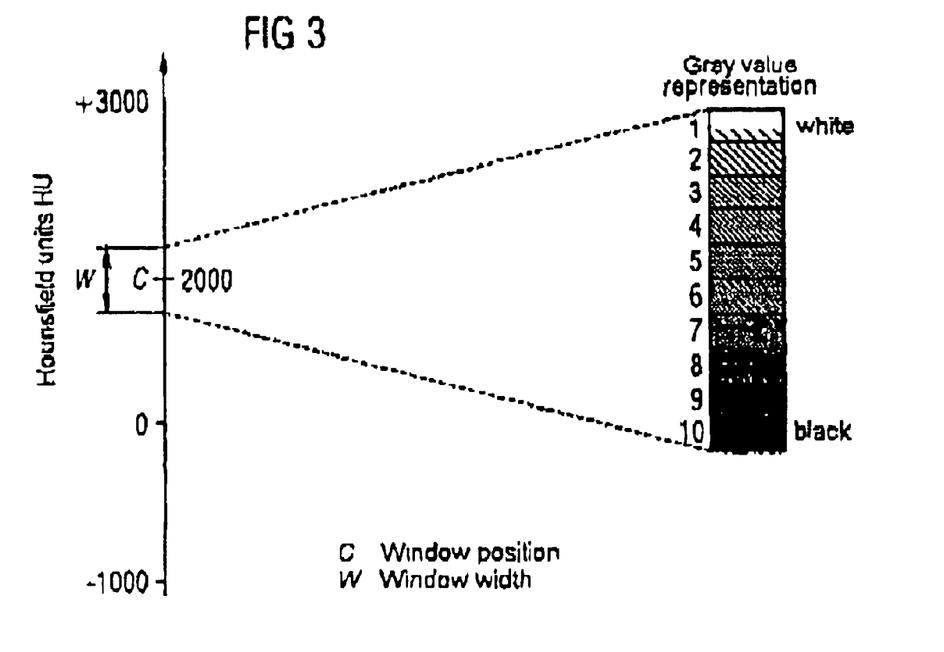
FIG. 3 shows windowing in the representation of CT images.

For conventional CT devices, 4096 ($=2^{12}$) different gray values are available to represent the entire Hounsfield scale. However, only a maximum of 60 to 80 gray steps can be distinguished by the observer. For this reason, during CT imaging—as already mentioned—windowing is performed, in which the entire gray value scale is allocated to an HU interval of interest. In FIG. 3, this is illustrated by way of example for the region of compact bone substance. The user defines the window interactively by way of its centre (window position C) and width (window width W), for example by way of a mouse or rotary knob. In the example of FIG. 3, the centre is at C=2000, the window width is W=400. In this case, 10 gray steps between white and black are allocated to the window.

An inventive aspect of an embodiment of the present applicatrion resides in optimizing a CT image in an organ-specific manner on the basis of the CT values in the HU scale and by way of appropriate windowing. According to an embodiment of the invention, it is proposed firstly to represent the CT values (HU values) of the image of a recorded layer in a histogram. A corresponding histogram lists the frequency of the HU values occurring in a CT image as a function of the HU values themselves. Because of the practical restriction of the integer CT and HU values to a closed value range, the representation of the image data in HU values is analogous to a representation of image data in gray values. Therefore, a histogram built up from HU values is frequently also referred to as a gray value histogram in the literature.

Figure 4:
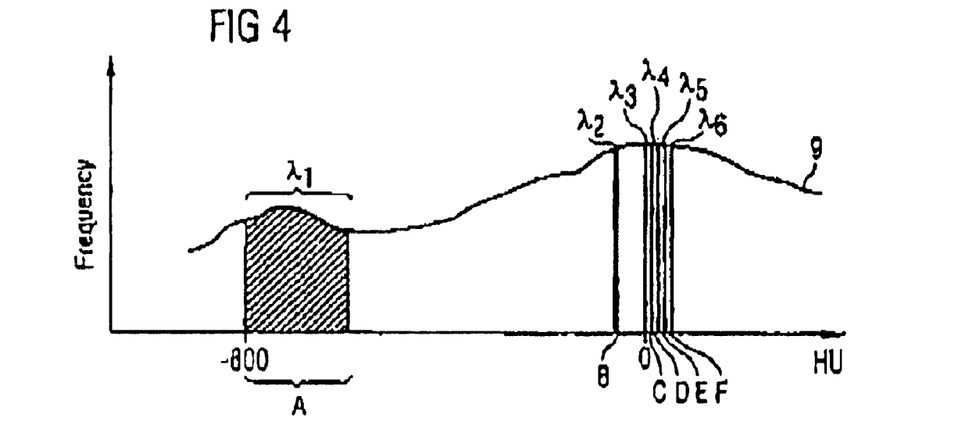
FIG. 4 shows a histogram of the HU values in the thorax region.

A histogram which is exemplary of the thorax region is illustrated in FIG. 4. Individual HU regions of the histogram (A, B, C, D, E, F) correlate with specific organ structures or, expressed in other words: segment sections (A, B, C, D, E, F) of the HU distribution curve 9 are allocated uniquely to an organ or a tissue structure. In the case of the histogram of FIG. 4, the HU region A, for example, correlates with lung tissue, the region B with fat tissue, C with embedded water, D with blood (e.g. aorta), E with liver tissue and F with heart tissue.

In order to be able to perform organ-specific setting of the image characteristics (image noise and image sharpness), the respective organ- and tissue-specific HU regions are defined in the histogram. Then, in the simplest case of the embodiment according to the invention, each organ-specific curve section HU(x,y) is assigned its own transfer function $\lambda(HU(x,y))$. In this case, HU(x,y) signifies the HU value at the coordinates (x,y) of the CT image whose total frequency is plotted at the corresponding HU value in the histogram. The transfer function $\lambda(HU(x,y))$ changes the respective HU value HU(x,y) in such a way that anatomically associated, that is organ- or tissue-specific, image regions are delimited optically from other image regions. $\lambda$ can therefore be understood as a filter function with which all the image pixels I(x,y) of the respective HU region are filtered. Mathematically, this may be represented as follows:

$$I(\lambda(HU(x,y))=\lambda(HU(x,y) \cdot I(x,y)$$

In the simplest case, $\lambda$ is a constant function which has a specific value for each organ-specific HU region. For the image representation, this indicates that the tissue-specific HU value regions to be emphasized are each assigned a specific gray value in the image. This specific value has to be defined by the user, taking account of the desired image characteristic of the corresponding organ. In the CT image, this leads to the pixel ranges which belong to corresponding organ-specific gray value zones being filtered or manipulated differently.

Figure 5:
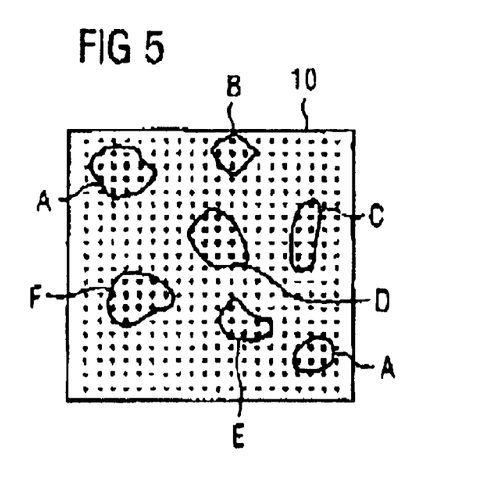
FIG. 5 shows an allocation of different discrete filter functions (transfer functions) to different anatomical tissue.

FIG. 5 represents in simplified form a CT image 10 which has been reconstructed from the raw data and in which the organ-specific gray value zones which belong to the histogram sections from FIG. 4 are circled. As can be seen from the HU region A, the gray value zones do not necessarily have to cohere. In the example of FIGS. 4 and 5, the organ-specific regions A, B, C, D, E, F are filtered on an HU basis.

This HU-based filtering may be described mathematically as follows:

$$I(\lambda_1)=\lambda_1 \cdot I(HU(x,y)), HU \in A$$

$$I(\lambda_2)=\lambda_2 \cdot I(HU(x,y)), HU \in B$$

. . .

$$I(\lambda_6)=\lambda_6 \cdot I(HU(x,y)), HU \in F$$

According to an embodiment of the invention, each transfer function $\lambda_i$ is selected in such a way that the corresponding organ or tissue i appears with the desired optimum image characteristic.

Following image filtering in accordance with the above procedure, in a further step of an embodiment of the invention, the different HU regions are represented with different windowing. In this case, the average HU value of the structure i of interest is chosen as the centre of the window. The window width depends on the attenuation differences of the respective structure: for the representation of very small attenuation differences, such as in the case of brain tissue, a narrow window is chosen, in the case of large attenuation differences, such as in the case of lung tissue, a wide window is chosen.

The advantage of the method according to an embodiment of the invention can be seen clearly by using FIG. 5: according to a known method, with regard to the image characteristic, a large number of CT images 10 have to be produced, selected by hand and then, in the selected CT images, the appropriate organ structures have to be segmented and inserted into the final image. In an embodiment of the present invention, the automatically created histogram of the image data provides the relationship between the organ structure i and the associated image elements (pixels: x,y). It is merely necessary for the respective transfer function $\lambda_i$ to be predefined by the user.

Under certain circumstances, it is desirable to create the histogram only after previously executed manipulation of the reconstructed CT image in the form of image filtering. For example, following smoothing of the CT image, it is possible to represent vessels in the lung parenchyma with the same sharpness as the lung parenchyma itself (a parenchyma is the assembly of cells in an organ which determines its function). If the CT image of a lung recording is sufficiently highly smoothed, then the entire lung, including its vessel structures (not part of the lungs) can be represented in a coherent interval of the histogram. An initial image smoothed in this way will be designated $I_{smooth}$ in the following text. In exactly the same way, however, it may be that, in order to create the histogram, a high-contrast initial image $I_{sharp}$ is required in order, for example, to represent extra-organic tissue with just as high a sharpness.

The respective HU-based image filtering may be represented as follows in these two cases:

$$I(\lambda_i)=\lambda_i \cdot I_{smooth}(HU(x,y)), HU \in i$$

and, respectively, $$I(\lambda_i)=\lambda_i \cdot I_{sharp}(HU(x,y)), HU \in i$$

where i here stands symbolically for the HU value region of the organ structure i.

Figure 6:
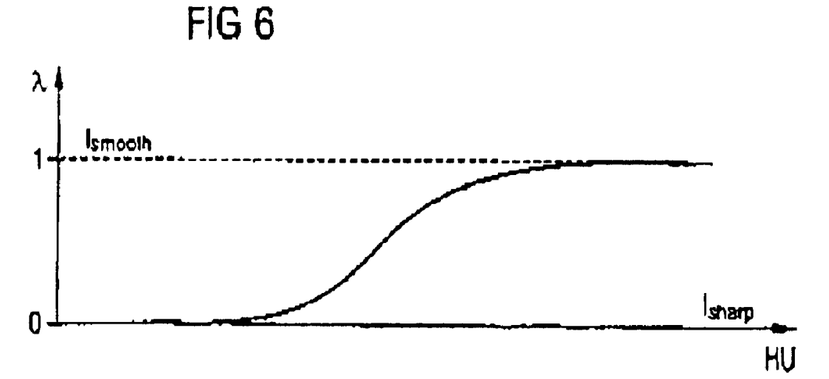
FIG. 6 shows the course of a continuous transfer function by which CT images with a smooth and sharp image characteristic ($I_{sharp}$ and $I_{smooth}$) are mixed.

In a further embodiment of the invention, the transfer function $\lambda$, with which the organ-specific histogram regions are filtered, is not discrete but—as illustrated for example in FIG. 6—has a continuous course over the entire histogram region. The course is defined by the user for each layer of the body to be measured. The magnitude of $\lambda$ moves in an interval between 0 and 1. HU-based continuous image filtering of this type may be described mathematically as a mixture of two extreme initial CT images $I_{smooth}$ and $I_{sharp}$:

$$I(\lambda(HU(x, y))=\lambda(HU(x,y)) \cdot I_{sharp}(x,y)+(1-\lambda(HU(x,y))) \cdot I_{smooth}(x,y)$$

or else, conversely:

$$I(\lambda(HU(x, y))=\lambda(HU(x,y)) \cdot I_{smooth}(x,y)+(1-\lambda(HU(x,y))) \cdot I_{sharp}(x,y)$$

The mixture of the two initial images is carried out in this way locally or pixel by pixel by way of the HU-value-dependent transfer function $\lambda(HU(x,y))$.

The production of initial CT images $I_{sharp}$ and $I_{smooth}$, that is to say of CT images with an extremely sharp or extremely smooth image characteristic, may be implemented in different ways. As early as during the reconstruction of the image from the CT raw data—for example by way of Fourier transformation—it is possible to influence the image characteristic before the back-transformation by way of the selection of an appropriate convolution core (or its Fourier transform). A sharp, edge-emphasizing convolution core supplies a high-contrast initial image $I_{sharp}$ with correspondingly high image noise, while a more gently smoothing convolution core reduces the local resolution but produces a low-noise image $I_{smooth}$.

Another possibility is to set the image characteristic caused by a CT convolution core retrospectively from the already reconstructed initial CT image by way of a two-dimensional separable image filter. It is even simpler to replace a two-dimensional separable image filter by two one-dimensional image filters.

Figure 7:
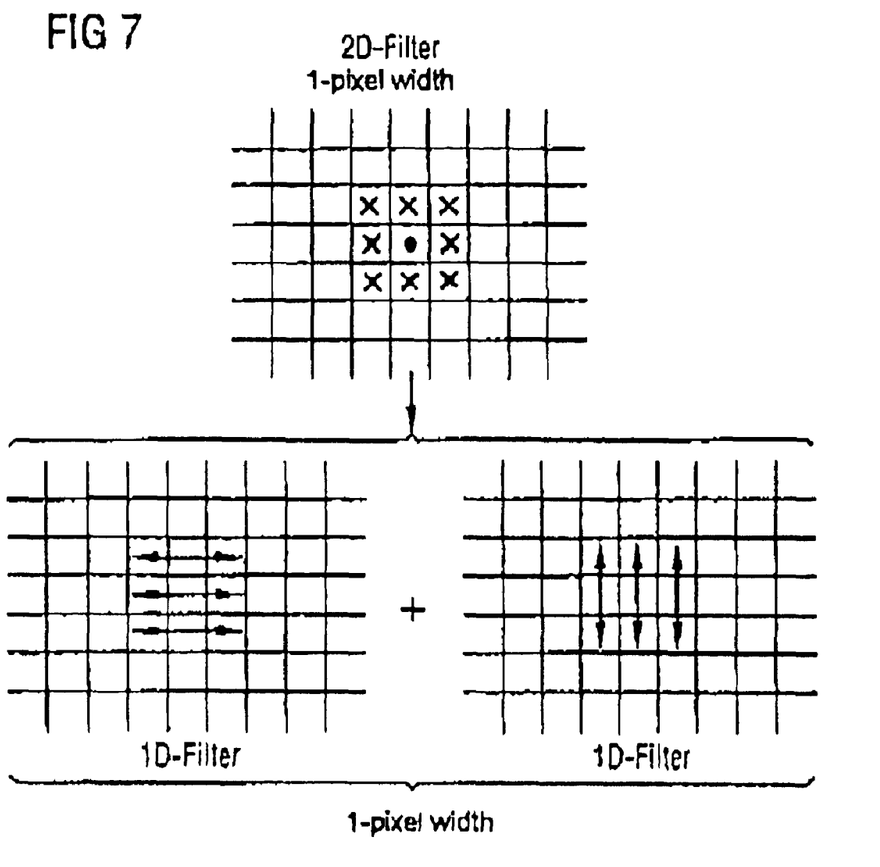
FIG. 7 shows how a two-dimensional separable image filter can be replaced by two one-dimensional image filters.

As FIG. 7 illustrates, in the case of a two-dimensional separable image filter with a 1-pixel width, a total of 9 pixels are involved in order to filter one pixel. If the two-dimensional separable image filter according to FIG. 7 is replaced by 2 one-dimensional image filters each having a 1-pixel width, then only three pixels, a total therefore of six pixels, are involved in the filtering for each pixel in each dimension.

Ultimately, retrospective manipulation of the CT image with 2 one-dimensional image filters firstly signifies a considerable reduction in the computing time. Secondly, filtering of the reconstructed image makes it unnecessary to store the raw data.

The method and the technique of setting the image characteristic brought about by a CT convolution core by way of a two-dimensional separable image filters or by way of two one-dimensional image filter is presented extensively in T. Flohr, S. Schaller, A. Stadtler et al., "Fast image filters as an alternative to reconstruction kernels in Computed Tomography", Proceedings of SPIE, vol. 4322 (2001), pp 924–933, the entire contents of which are hereby incorporated herein by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for organ-specific image optimization in computed tomography (CT), comprising:
   recording a layer of a body with a CT device;
   creating a first CT image based upon Hounsfield values (HU values) calculated for the recorded layer of the body;
   creating an HU-value frequency distribution of the first CT image of a layer in a histogram;
   defining at least one organ-specific HU region;
   allocating an HU-dependent transfer function to the organ-specific HU region; and
   filtering the first CT image with the IU-dependent transfer function;
   creating a second CT image based upon the HU values calculated for the recorded layer of the body;
   filtering the second CT image with the HU-dependent transfer function; and
   mixing the filtered first CT image with the filtered second CT image.

2. The method as claimed in claim 1, wherein a first image filter is used to create the first CT image.

3. The method as claimed in claim 1, wherein a second image filter is used to create the second CT image.

4. The method as claimed in claim 1, wherein a first convolution core is used to create the first CT image.

5. The method as claimed in claim 1, wherein a second convolution core is used to create the second CT image.

6. The method as claimed in claim 2, wherein the first CT image is produced as a smoothed CT image.

7. The method as claimed in claim 6, wherein the second CT image is produced as a high-contrast CT image.

8. The method as claimed in claim 1, wherein the magnitude of the HU-dependent transfer function moves in an interval between 0 and 1.

9. The method as claimed in claim 1, wherein the mixing of the first CT image with the second CT image is carried out as a weighted, pixel by pixel addition of the first CT image to the second CT image.

10. The method as claimed in claim 9, wherein the weighting factor of the first CT image corresponds to the magnitude of the HU-dependent transfer function, and the weighting factor of the second CT image corresponds to the difference between the magnitude of the HU-dependent transfer function and the value 1.

11. The method as claimed in claim 9, wherein the weighting factor of the first CT image corresponds to the difference between the magnitude of the HU-dependent transfer function and the value 1, and the weighting factor of the second CT image corresponds to the magnitude of the HU-dependent transfer function.

12. The method as claimed in claim 1, wherein, to create at least one of the first and second CT image, a two-dimensional separable image filter is used.

13. The method as claimed in claim 1, wherein, to create at least one of the first and second CT image, two one-dimensional image filters are used.

14. The method as claimed in claims 1, wherein different HU regions are represented with different windowing.

15. A computed tomography device, comprising:
   a computer for processing measured data; and
   a monitor for displaying the data processed by the computer, wherein the computer is designed to carry out the method as claimed in claim 1 on the computed tomography device.

16. A computer program product having a series of physical states which are suitable to be implemented by a computing device, connected to a computed tomography device in such a way that a method as claimed in claim 1 is adapted to be carried out on the computed tomography device.

17. The method as claimed in claim 2, wherein a second image filter is used to create the second CT image.

18. The method as claimed in claim 4, wherein a second convolution core is used to create the second CT image.

19. The method as claimed in claim 3, wherein the first CT image is produced as a smoothed CT image.

20. The method as claimed in claim 19, wherein the second CT image is produced as a high-contrast CT image.

21. The method as claimed in claim 4, wherein the first CT image is produced as a smoothed CT image.

22. The method as claimed in claim 21, wherein the second CT image is produced as a high-contrast CT image.

23. The method as claimed in claim 5, wherein the first CT image is produced as a smoothed CT image.

24. The method as claimed in claim 23, wherein the second CT image is produced as a high-contrast CT image.

25. A computed tomography device, comprising:
   a computer for processing measured data; and
   a monitor for displaying the data processed by the computer, wherein the computer is designed to carry out the method as claimed in claim 9 on the computed tomography device.

26. A computer program product having a series of physical states which are suitable to be implemented by a computing device, connected to a computed tomography device in such a way that a method as claimed in claim 9 is adapted to be carried out on the computed tomography device.

27. A method for organ-specific image optimization in computed tomography (CT), comprising:
   creating a first and second CT image based upon Hounsfield values (HU values) calculated for a layer of a body previously with a CT device;
   creating an HU-value frequency distribution of the first CT image of a layer in a histogram;
   assigning an HU-dependent transfer function to at least one organ-specific HU region;
   filtering the first and second CT image with the HU-dependent transfer function; and
   mixing the filtered first CT image with the filtered second CT image.

28. The method as claimed in claim 27, wherein the mixing of the first CT image with the second CT image is carried out as a weighted, pixel by pixel addition of the first CT image to the second CT image.

29. The method as claimed in claim 28, wherein the weighting factor of the first CT image corresponds to the magnitude of the HU-dependent transfer function, and the weighting factor of the second CT image corresponds to the difference between the magnitude of the HU-dependent transfer function and the value 1.

30. The method as claimed in claim 28, wherein the weighting factor of the first CT image corresponds to the difference between the magnitude of the HU-dependent transfer function and the value 1, and the weighting factor of the second CT image corresponds to the magnitude of the HU-dependent transfer function.

31. A computed tomography device, comprising:
   a computer for processing measured data; and
   a monitor for displaying the data processed by the computer, wherein the computer is designed to carry out the method as claimed in claim 27 on the computed tomography device.

32. A computer program product having a series of physical states which are suitable to be implemented by a computing device, connected to a computed tomography device in such a way that a method as claimed in claim 27 is adapted to be carried out on the computed tomography device.

* * * * *